United States Patent
Shen et al.

(10) Patent No.: US 12,140,784 B2
(45) Date of Patent: Nov. 12, 2024

(54) OPTICAL DIFFUSING ELEMENT AND LIGHT EMITTING ASSEMBLY FOR THREE-DIMENSION SENSING

(71) Applicant: DARWIN PRECISIONS CORPORATION, Hsinchu County (TW)

(72) Inventors: Wen-Tai Shen, Hsinchu County (TW); Pin-Feng Yu, Hsinchu County (TW); Ya-Han Ko, Hsinchu County (TW); Jung-Chih Tsai, Hsinchu County (TW)

(73) Assignee: DARWIN PRECISIONS CORPORATION, Hsinchu County (TW)

( * ) Notice: Subject to any disclaimer, the term of this patent is extended or adjusted under 35 U.S.C. 154(b) by 584 days.

(21) Appl. No.: 17/373,783

(22) Filed: Jul. 13, 2021

(65) Prior Publication Data
US 2022/0244435 A1   Aug. 4, 2022

(30) Foreign Application Priority Data
Feb. 2, 2021   (TW) .................................. 110103751

(51) Int. Cl.
*G02B 5/02* (2006.01)
*G01B 11/00* (2006.01)

(52) U.S. Cl.
CPC .......... *G02B 5/0273* (2013.01); *G01B 11/002* (2013.01); *G02B 5/021* (2013.01)

(58) Field of Classification Search
CPC .. G02B 5/0273; G02B 5/0226; G01B 11/002; G01S 17/89; G01S 7/4814
See application file for complete search history.

(56) References Cited

U.S. PATENT DOCUMENTS

2004/0130790 A1* 7/2004 Sales .................. G02B 27/0961
359/619
2015/0293271 A1* 10/2015 Miyasaka ............ G02B 5/0268
353/38
(Continued)

FOREIGN PATENT DOCUMENTS

CN 107850697 A 3/2018
CN 112068232 A * 12/2020
(Continued)

OTHER PUBLICATIONS

Machine translation of CN 112068232 A (Year: 2020).*
(Continued)

*Primary Examiner* — Darryl J Collins
*Assistant Examiner* — Matthew Y Lee

(57) ABSTRACT

An optical diffusing element includes a light emitting surface. The light emitting surface has microstructures, each microstructure has a border, the border of each microstructure is completely connected with the borders of the adjacent microstructures, each microstructure has a surface profile, and a functional formula of the surface profile is:

$$s(x) = \frac{x^2}{R + \sqrt{R^2 - (\kappa + 1)x^2}};$$

s(x) represents the surface profile of each microstructure on an x-axis. The value x represents a vertical projection position of the surface profile on the x-axis. The value R represents a curvature radius of a vertex of each microstructure. The value κ represents a conic coefficient of each microstructure. The microstructures have the same value R and value κ. A light emitting assembly for three-dimension sensing includes the optical diffusing element and a light
(Continued)

source. The optical diffusing element and the light emitting assembly for three-dimension sensing have the advantages of controlling light shape, light profile and simplifying design.

13 Claims, 7 Drawing Sheets

(56) References Cited

U.S. PATENT DOCUMENTS

| | | | | |
|---|---|---|---|---|
| 2020/0133012 | A1* | 4/2020 | Sales | G02B 5/0215 |
| 2020/0407271 | A1* | 12/2020 | Ono | C03C 23/0025 |
| 2022/0128741 | A1* | 4/2022 | Cheng | G02B 3/0081 |
| 2022/0155611 | A1* | 5/2022 | Ojala | G02B 27/0075 |

FOREIGN PATENT DOCUMENTS

| | | |
|---|---|---|
| TW | I390250 B1 | 3/2013 |
| TW | I539624 B | 6/2016 |

OTHER PUBLICATIONS

Xiao Xiong Zhi Guang, "Aspheric Design", Web page <https://kknews.cc/news/v6q6o2a.html>, 1 page, Aug. 26, 2018, retrieved on May 31, 2021.

* cited by examiner

OPTICAL DIFFUSING ELEMENT AND LIGHT EMITTING ASSEMBLY FOR THREE-DIMENSION SENSING

FIELD OF THE INVENTION

The present invention relates to an optical diffusing element and a light emitting assembly for three-dimension sensing.

BACKGROUND OF THE INVENTION

At present, time of flight (TOF) three-dimensional sensing technology often uses optical diffusing elements to achieve the effect of light profile control. Specifically, when the light generated by the light source enters the optical diffusing element, it is scattered by the microstructures of the optical diffusing element, so that the light emitted from the microstructures has a specific light profile, and thus the light profile control is achieved. In order to control different light profiles, the design of the microstructures uses probability distribution functions to randomly adjust the depth, border, and space control parameters to control the shape and distribution of the microstructures, so as to achieve the effect of controlling different light profiles.

Using the probability distribution function to randomly adjust the depth, border, and space control parameters can fine-tune the light profile in some areas to make the light profile more in line with expectations; however, an additional design for similar sag profiles to fill the blank areas between adjacent microstructures is still needed. Thus, the boundary processing is extremely complicated. Therefore, although the optical diffusing elements of the prior art can achieve the light profile control effect, it has the problem of complicated design.

SUMMARY OF THE INVENTION

The invention provides an optical diffusing element, which not only has the function of controlling the light profile, but also has the advantage of simplifying the design.

The invention provides a light emitting assembly for three-dimension sensing, which has the advantages of controlling light profile and simple design.

The optical diffusing element provided by the invention includes a light emitting surface. The light emitting surface has a plurality of microstructures. Each of the microstructures has a border. The border of each of the microstructures is completely connected with the borders of the adjacent microstructures, each of the microstructures has a surface profile, and a functional formula of the surface profile is as follows:

$$s(x) = \frac{x^2}{R + \sqrt{R^2 - (\kappa + 1)x^2}};$$

wherein s(x) represents the surface profile of each of the microstructures on an x-axis, the value x represents a vertical projection position of the surface profile on the x-axis, and the value R represents a curvature radius of a vertex of each of the microstructures, the value κ represents a conic coefficient of each of the microstructures, and the microstructures have the same value R and the same value κ.

In an embodiment of the invention, a ratio (κ/R) of the curvature radius to the conic coefficient satisfies the following condition: $-180 < \kappa/R \leftarrow 20$.

In an embodiment of the invention, each of the microstructures mentioned above is suitable for forming a light profile, the light profile has a viewing angle, and a function formula of the viewing angle is as follows: FOV=A(κ/R)+B; wherein the FOV represents the viewing angle of the light profile, and the value A and the value B satisfy the following condition: $-0.1 < A \leftarrow 1$, and B is a constant greater than 0.

In an embodiment of the invention, each of the microstructures has a virtual aperture (φ), the virtual aperture is a difference between the two values x when s(x) in the function formula of the surface profile is 0, where 20 μm<φ<100 μm.

In an embodiment of the invention, the microstructures mentioned above are arranged on the light emitting surface in a random manner.

In an embodiment of the invention, an orthographic projection of the border of each of the microstructures mentioned above presents a polygonal shape on the light emitting surface.

In an embodiment of the invention, the microstructures mentioned above protrude from the light emitting surface.

In an embodiment of the invention, the microstructures mentioned above are recessed into the light emitting surface.

The light emitting assembly for three-dimension sensing provided by the invention includes the optical diffusing element mentioned above and a light source. The optical diffusing element has a light incident surface opposite to the light emitting surface. The light source emits an illumination light beam toward the light incident surface. The illumination light beam enters the optical diffusing element through the light incident surface and then emits from the microstructures of the light emitting surface to form an emitting light beam.

In an embodiment of the invention, the emitting light beam mentioned above has an average maximum luminous angle relative to a normal of the light incident surface, and the average maximum luminous angle is 15° to 65°.

In the optical diffusing element and the light emitting assembly for three-dimensional sensing of the invention, the surface profiles of the microstructures have the same value R and the same value κ, the border of each of the microstructures is completely connected with the borders of the adjacent microstructures, so that there will be no blank area between adjacent microstructures. In this way, there is no need to design additional surface profiles to fill in the blank areas, which simplifies the boundary processing in the design of the optical diffusing element. In addition, by using the microstructure, the optical diffusing element of the embodiment can achieve the effect of controlling the light profile, so that the light can form a specific light profile after passing through and being scattered by the microstructure. Therefore, in addition to maintaining the function of controlling the light profile, the optical diffusing element and the light emitting assembly for three-dimensional sensing of the invention have the advantage of simplifying the design.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
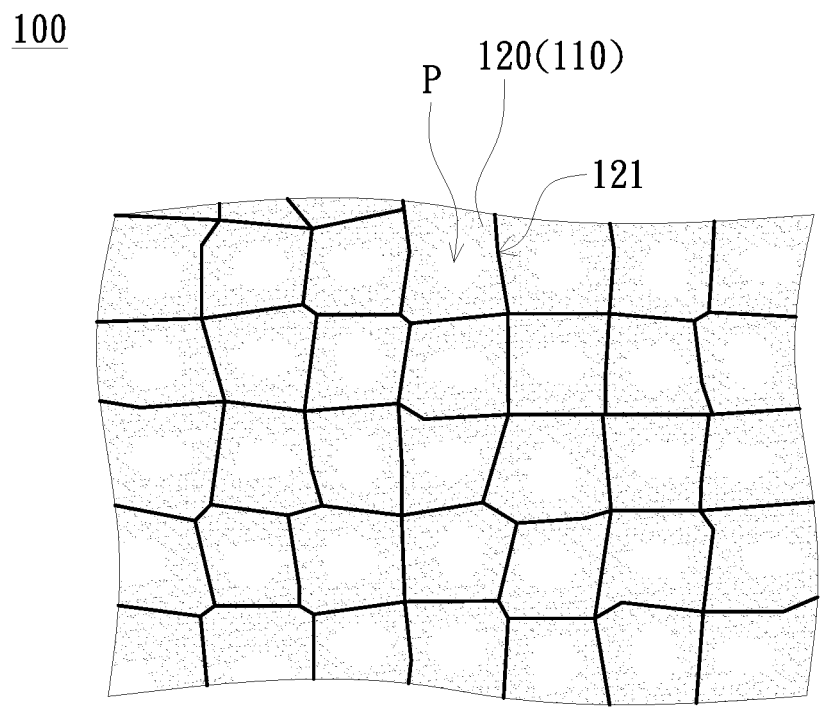
FIG. 1 is a schematic top diagram of an optical diffusing element in accordance with an embodiment of the invention.
Figure 2:
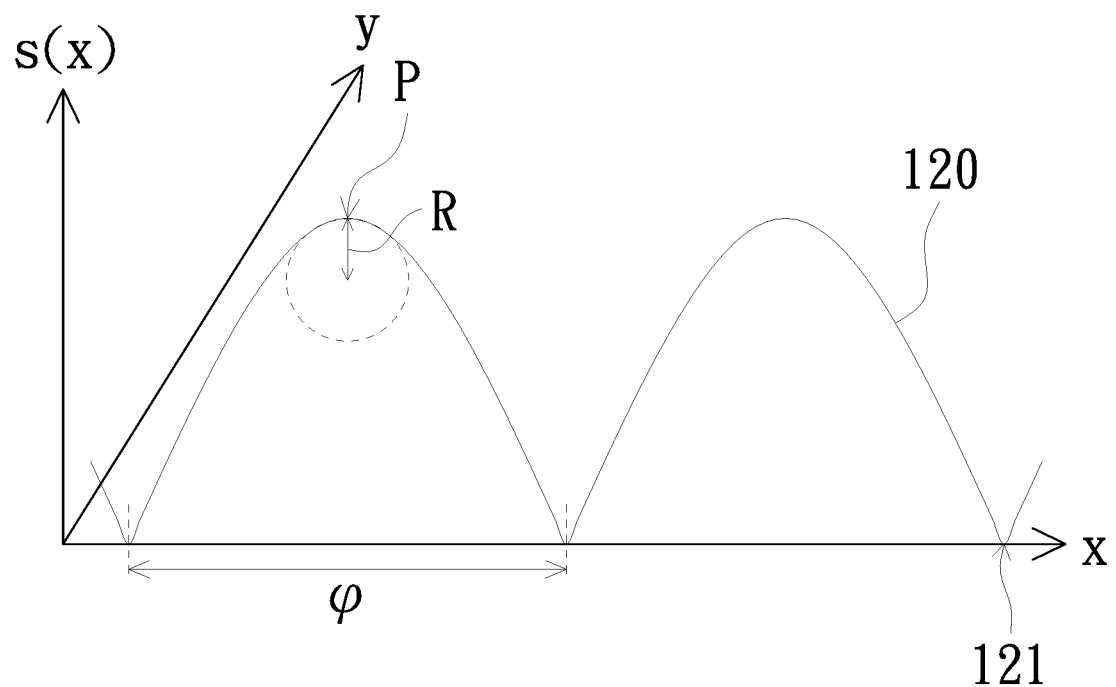
FIG. 2 is a schematic diagram of a surface profile of microstructures of an optical diffusing element on the x axis in accordance with an embodiment of the invention.
Figure 3:
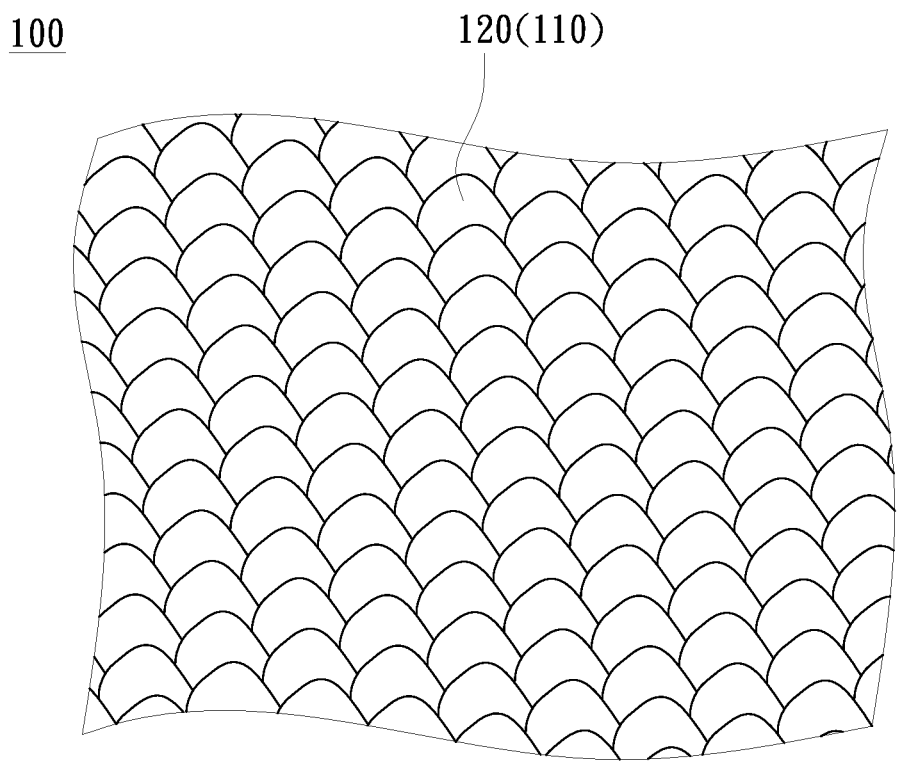
FIG. 3 is a schematic diagram of the appearance of microstructures of an optical diffusing element in accordance with an embodiment of the invention.
Figure 4:
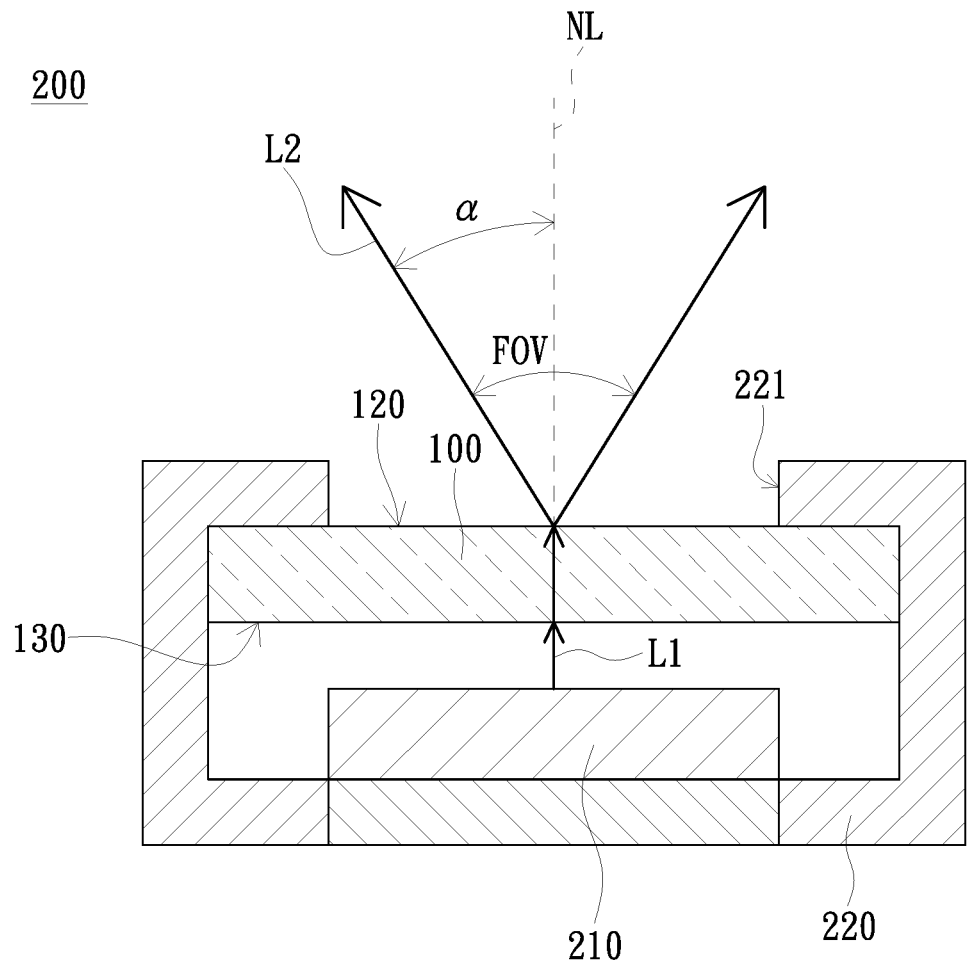
FIG. 4 is a schematic diagram of an application of an optical diffusing element in accordance with an embodiment of the invention.

FIG. 1 is a schematic top diagram of an optical diffusing element in accordance with an embodiment of the invention. FIG. 2 is a schematic diagram of a surface profile of microstructures of an optical diffusing element on the x axis in accordance with to an embodiment of the invention, wherein the s(x) axis, the x axis and the y axis intersect positively in FIG. 2. FIG. 3 is a schematic diagram of the appearance of microstructures of an optical diffusing element in accordance with an embodiment of the invention. FIG. 4 is a schematic diagram of an application of an optical diffusing element in accordance with an embodiment of the invention. As shown in FIGS. 1 to 4, the optical diffusing element 100 of the invention has a light emitting surface 110. The light emitting surface 110 has a plurality of microstructures 120. Each of the microstructures 120 has a border 121. The border 121 of each of the microstructures 120 is completely connected with the borders 121 of the adjacent microstructures 120. Each of the microstructures 120 has a surface profile. The functional formula of the surface profile is as follows:

$$s(x) = \frac{x^2}{R + \sqrt{R^2 - (\kappa+1)x^2}}$$

wherein s(x) represents the surface profile of each of the microstructures 120 on an x-axis, the value x represents a vertical projection position of the surface profile on the x-axis, the value R represents a curvature radius of a vertex P of each of the microstructures 120, the value κ represents a conic coefficient of each of the microstructures 120, and the microstructures 120 have the same value R and the same value κ.

In the optical diffusing element 100 of the embodiment, the surface profiles of the microstructures 120 have the same value R and the same value κ. The border 121 of each of the microstructures 120 is completely connected with the borders 121 of the adjacent microstructures 120, so that there will be no blank area between the adjacent microstructures 120. In this way, there is no need to design additional surface profiles to fill in the blank areas, which simplifies the boundary processing in the design of the optical diffusing element 100. In addition, by using the microstructure 120, the optical diffusing element 100 of the embodiment can achieve the effect of controlling the light profile, so that the light can form a specific light profile after passing through and being scattered by the microstructure 120.

Each of the microstructures 120 has a virtual aperture φ. The virtual aperture φ is the difference between the two values x when s(x) is 0, where 20 μm<φ<100 μm. In one embodiment, the virtual aperture φ is, for example, but not limited to 30 μm, 50 μm, or 70 μm.

A ratio (κ/R) of the curvature radius to the conic coefficient satisfies the following condition: −180<κ/R≤−20. In one embodiment, the value κ/R is, for example, but not limited to −150, −120, −100, or −50. In addition, an illumination light beam L1 enters the optical diffusing element 100 through the light incident surface 130 and then emits from the microstructures 120 of the light emitting surface 110 to form a transmit emitting light beam L2. The light profile of the emitting light beam L2 has a viewing angle α; that is, each of the microstructures 120 is suitable for forming the light profile having the viewing angle. In one embodiment, the function formula of the viewing angle is as follows $$FOV = A(\kappa/R) + B;$$

wherein FOV represents the viewing angle of the light profile, and the value A and value B satisfy the following condition: −0.1<A<−1, and B is a constant greater than 0. For example, the value A is but not limited to −0.05, 0, or 0.05, and the value B is but not limited to 1, 2.5, or 10. In one embodiment, the viewing angle is between 30° and 130°. For example, the viewing angle is but not limited to 60°, 90° or 120°.

Figure 5:
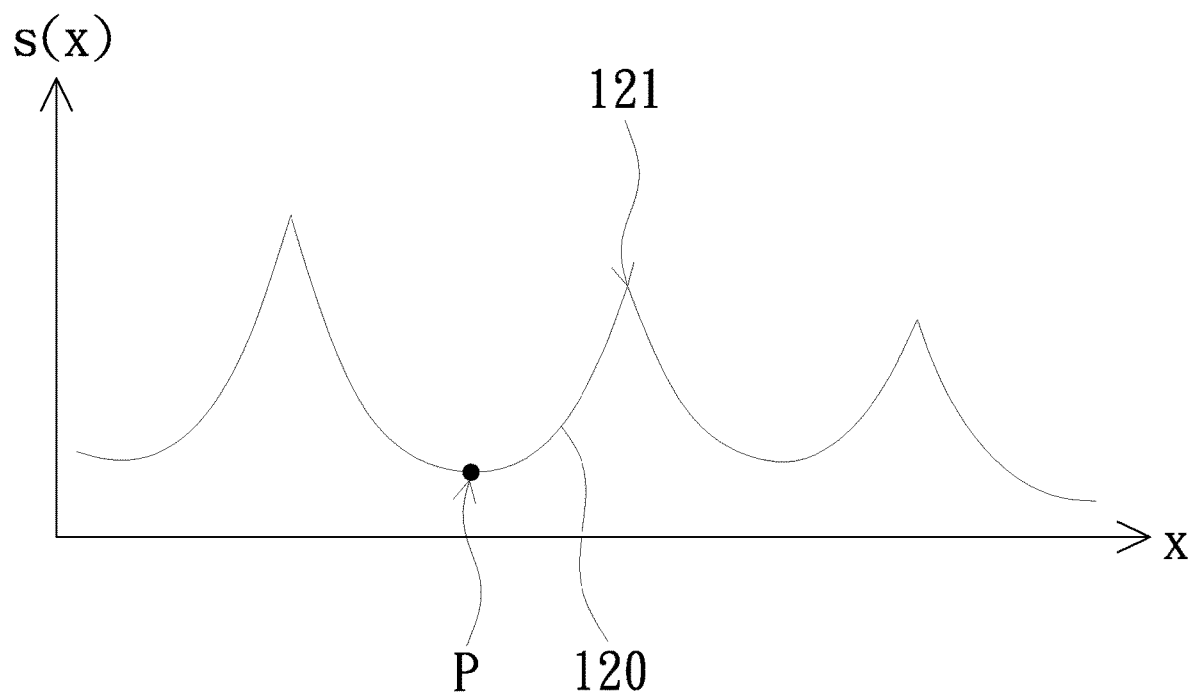
FIG. 5 is a schematic diagram of surface profiles of microstructures of an optical diffusing element on the x axis in accordance with an embodiment of the invention.

The microstructures 120 are arranged on the light emitting surface 110 in a random manner. An orthographic projection of the border 121 of each of the microstructures 120 on the light emitting surface 110 may present a polygonal shape. In one embodiment as shown in FIG. 1, the polygonal shape has, for example, at least four sides. In addition, as shown in FIG. 3, the vertex P of the microstructure 120 is higher than the border 121; that is, the microstructure 120 protrudes from the light emitting surface 110, but the invention is not limited thereto. FIG. 5 is a schematic diagram of a surface profile of microstructures of an optical diffusing element on the x axis in accordance with an embodiment of the invention. As shown in FIG. 5, the vertex P of the microstructure 120 is lower than the border 121; that is, the microstructure 120 can also be recessed into the light emitting surface 110.

Figure 6:
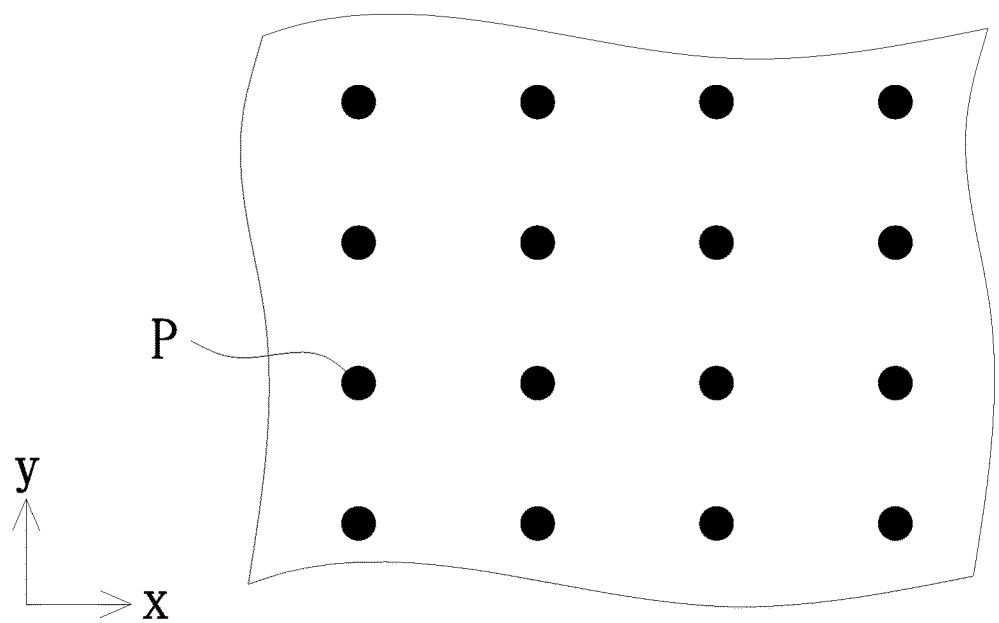
FIG. 6 is a schematic diagram of a central distribution of microstructures of an optical diffusing element in the boundary calculation in accordance with an embodiment of the invention.
Figure 7:
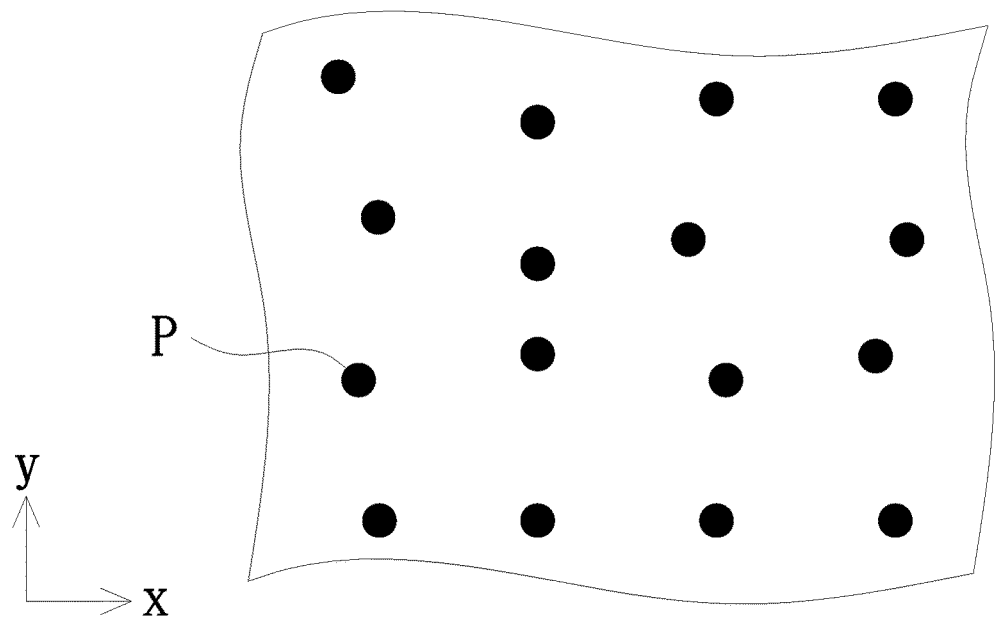
FIG. 7 is a schematic diagram of a central distribution of microstructures of an optical diffusing element in the boundary calculation in accordance with an embodiment of the invention.
Figure 8A:
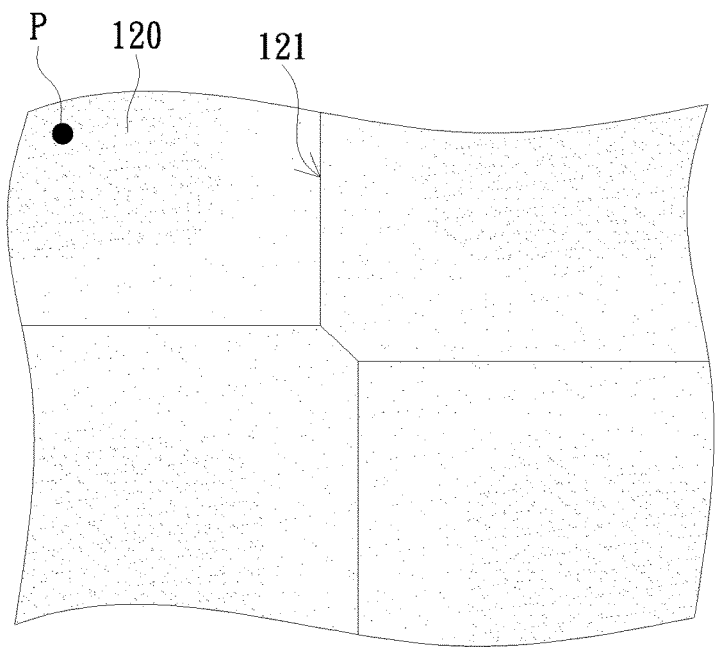
FIG. 8A is a top schematic diagram of microstructures of an optical diffusing element in the boundary calculation in accordance with an embodiment of the invention.
Figure 8B:
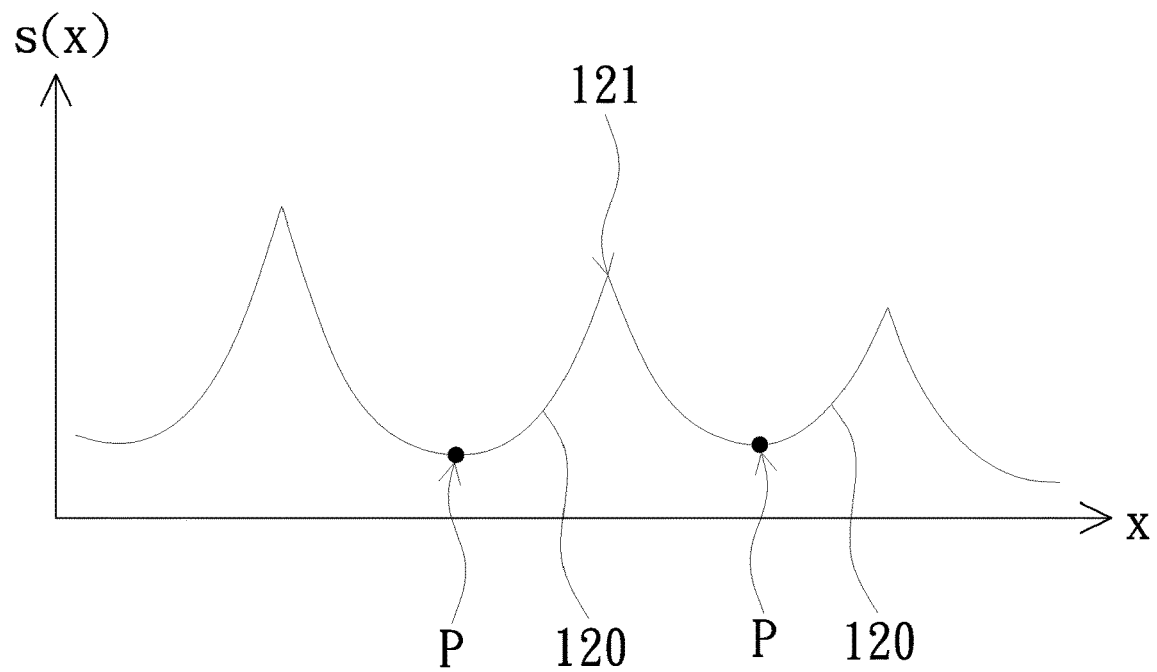
FIG. 8B is a schematic diagram of a surface profile distribution of microstructures of an optical diffusing element in the boundary calculation in accordance with an embodiment of the invention.

In the invention, the optical diffusing element 100 can be designed for production through the following boundary calculation processing. The steps of the boundary calculation processing are as follows: predetermining the function of the surface profiles of the microstructures 120 to be nested (i.e., selecting the value R and the value κ that satisfy the aforementioned condition; next, calculating the position of the center (vertex P) of each of microstructures 120 in the fabricated area (as shown in FIG. 6, the centers are regularly arranged on the x-y plane), and using a probability distribution function to randomly adjust the position of each of the microstructures 120 in space (as shown in FIG. 7, the centers are randomly arranged on the x-y plane); and next, writing the predetermined function of the surface profiles of the microstructures 120 to be nested to the centers of the microstructures 120 from the inside to the outside, and extending to the periphery to connect with the borders 121 of the adjacent microstructures 120 (it can be seen from the top schematic diagram of the microstructure 120 shown in FIG. 8A and the surface profile distribution diagram shown in FIG. 8B that the borders 121 of the two adjacent microstructures 120 are connected). Thus, the design of the optical diffusing element 100 of the invention is completed.

In one embodiment as shown in FIGS. 1 to 4, the optical diffusing element 100 and the light source 210 are used together to form a light emitting assembly 200 for three-dimensional sensing. The light incident surface 130 of the optical diffusing element 100 is opposite to the light emitting surface 110. The light source 210 emits an illumination light beam L1 toward the light incident surface 130. The illumination light beam L1 enters the optical diffusing element 100 through the light incident surface 130 and then emits from the microstructures 120 of the light emitting surface 110 to form the emitting light beam L2. In addition, the light emitting assembly 200 for three-dimensional sensing may further have a casing 220. The casing 220 has an opening portion 221. The light source 210 is disposed in the casing 220. The optical diffusing element 100 is disposed at the opening portion 221. The light incident surface 130 is located between the light emitting surface 110 and the light source 210. Further, in the embodiment, although the optical diffusing element is exemplified by the optical diffusing element 100 shown in FIGS. 1 to 3, the optical diffusing element can also be replaced with the optical diffusing element 100 of any of the foregoing embodiments. In addition, the light source 210 is, for example but not limited to, an infrared light source.

The emitting light beam L2 has an average maximum luminous angle α relative to a normal NL of the light incident surface 130, and the average maximum luminous angle α is 15° to 65°. In one embodiment, the average maximum luminous angle α is, for example but not limited to, 15°, 45°, or 65°.

Based on the above, in the optical diffusing element and the light emitting assembly for three-dimensional sensing of the embodiment of the invention, the surface profiles of the microstructures have the same value R and the same value κ, the border of each of the microstructures is completely connected with the borders of the adjacent microstructures, so that there will be no blank area between adjacent microstructures. In this way, there is no need to design additional surface profiles to fill in the blank areas, which simplifies the boundary processing in the design of the optical diffusing element. In addition, by using the microstructure, the optical diffusing element of the embodiment can achieve the effect of controlling the light profile, so that the light can form a specific light profile after passing through and being scattered by the microstructure. Therefore, in addition to maintaining the function of controlling the light profile, the optical diffusing element and the light emitting assembly for three-dimensional sensing of the embodiment of the invention have the advantage of simplifying the design.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An optical diffusing element, comprising:
a light emitting surface, having a plurality of microstructures, wherein each of the microstructures has a border, the border of each of the microstructures is completely connected with the borders of the adjacent microstructures, each of the microstructures has a surface profile and a virtual aperture (φ), and a functional formula of the surface profile is as follows:

$$s(x) = \frac{x^2}{R + \sqrt{R^2 - (\kappa + 1)x^2}};$$

wherein s(x) represents the surface profile of each of the microstructures on an x-axis, the value x represents a vertical projection position of the surface profile on the x-axis, and the value R represents a curvature radius of a vertex of each of the microstructures, the value κ represents a conic coefficient of each of the microstructures, wherein a ratio (κ/R) of the conic coefficient to the curvature radius satisfies the following condition: $-180 < \kappa/R \leftarrow 20$, and the microstructures have the same value R and the same value κ; and the virtual aperture is a difference between two values x when s(x) in the function formula of the surface profile is 0, where 20 μm<φ<100 μm.

2. The optical diffusing element according to claim 1, wherein each of the microstructures is suitable for forming a light profile, the light profile has a viewing angle, and a function formula of the viewing angle is as follows:

$$FOV = A(\kappa/R) + B$$

wherein FOV represents the viewing angle of the light profile, and the value A and the value B satisfy the following condition: $-0.1 < A \leftarrow 1$, and B is a constant greater than 0.

3. The optical diffusing element according to claim 1, wherein the microstructures are arranged on the light emitting surface in a random manner.

4. The optical diffusing element according to claim 1, wherein an orthographic projection of the border of each of the microstructures on the light emitting surface presents a polygonal shape.

5. The optical diffusing element according to claim 1, wherein the microstructures protrude from the light emitting surface.

6. The optical diffusing element according to claim 1, wherein the microstructures are recessed into the light emitting surface.

7. A light emitting assembly for three-dimension sensing, comprising:
an optical diffusing element, comprising:
a light emitting surface, having a plurality of microstructures, wherein each of the microstructures has a border, the border of each of the microstructures is completely connected with the borders of the adjacent microstructures, each of the microstructures has a surface profile and a virtual aperture ($\varphi$), and a functional formula of the surface profile is as follows:

$$s(x) = \frac{x^2}{R + \sqrt{R^2 - (\kappa+1)x^2}};$$

wherein s(x) represents the surface profile of each of the microstructures on an x-axis, the value x represents a vertical projection position of the surface profile on the x-axis, and the R value represents a curvature radius of a vertex of each of the microstructures, the $\kappa$ value represents a conic coefficient of each of the microstructures, wherein a ratio ($\kappa/R$) of the conic coefficient to the curvature radius satisfies the following condition: $-180<\kappa/R\leftarrow20$, and the microstructures have the same R value and the same $\kappa$ value; and the virtual aperture is a difference between two values x when s(x) in the function formula of the surface profile is 0, where 20 µm<$\varphi$<100 µm; and a light source;

wherein the optical diffusing element further has a light incident surface opposite to the light emitting surface, the light source emits an illumination light beam toward the light incident surface, the illumination light beam enters the optical diffusing element through the light incident surface and then emits from the microstructures of the light emitting surface to form an emitting light beam.

8. The light emitting assembly for three-dimension sensing according to claim 7, wherein the emitting light beam has an average maximum luminous angle relative to a normal of the light incident surface, and the average maximum luminous angle is 15° to 65°.

9. The light emitting assembly for three-dimension sensing according to claim 7, wherein each of the microstructures is suitable for forming a light profile, the light profile has a viewing angle, and the function formula of the viewing angle is as follows $FOV=A(\kappa/R)+B$ wherein FOV represents the viewing angle of the light profile, and the value A and the value B meet the following condition: $-0.1<A\leftarrow1$, and B is a constant greater than 0.

10. The light emitting assembly for three-dimension sensing according to claim 7, wherein the microstructures are arranged on the light emitting surface in a random manner.

11. The light emitting assembly for three-dimension sensing according to claim 7, wherein an orthographic projection of the border of each of the microstructures on the light emitting surface presents a polygonal shape.

12. The light emitting assembly for three-dimension sensing according to claim 7, wherein the microstructures protrude from the light emitting surface.

13. The light emitting assembly for three-dimension sensing according to claim 7, wherein the microstructures are recessed into the light emitting surface.

\* \* \* \* \*